UNITED STATES PATENT OFFICE.

EDWARD S. DAWSON, JR., OF SCHENECTADY, NEW YORK, ASSIGNOR TO GENERAL ELECTRIC COMPANY, A CORPORATION OF NEW YORK.

RESINOUS CONDENSATION PRODUCT.

1,085,112. Specification of Letters Patent. Patented Jan. 27, 1914.

No Drawing. Application filed May 31, 1913. Serial No. 770,893.

*To all whom it may concern:*

Be it known that I, EDWARD S. DAWSON, Jr., a citizen of the United States, residing at Schenectady, county of Schenectady, State of New York, have invented certain new and useful Improvements in Resinous Condensation Products, of which the following is a specification.

The present invention comprises a composition suitable as a varnish, or impregnant for insulating, and other purposes.

When citric acid combines with a polyhydric alcohol, such as glycerin, it forms a hard, strong resinous material which may be made substantially infusible and insoluble by heating. Although this material possesses some degree of tenacity and resiliency especially in thin layers it does not possess the flexibility desirable for some purposes, for example when used as an impregnant for paper or fabric for electrical insulating purposes.

In accordance with my invention greater flexibility is imparted to the resin by mixing with the ingredients entering into its constitution an organic compound of the aromatic series, such, for example, as dinitrobenzene, and then proceeding with the resinification.

In order to illustrate my invention I will describe in detail, the preparation of a glycerol resin of citric acid containing a flexibilizing agent. In order to secure complete miscibility of the aromatic substance, I prepare an alcoholic solution of citric acid and glycerin and add to it the flexibilizing agent. For example, to a mixture consisting by weight of about 11.4 parts of citric acid, 5 parts of glycerin and 5 parts of methyl alcohol is added about 1 to 10 parts of or even more of any of the following substances,—meta-dinitrobenzene, ethyl benzoate, acetanilid, or beta-naphthol or any desired mixture of the same. Articles to be impregnated, for example, paper, fabrics, or fabric-insulated electrical coils are dipped into this solution, in some cases repeatedly after intermediate drying. The impregnated articles are given first a preliminary baking treatment at a temperature of about 125° C. to drive out the alcohol and start the reaction. They are finally heated to a temperature of about 150 to 200° C. to complete the reaction, the lower temperatures of the range requiring a corresponding longer time. When sheets of paper or fabric are impregnated they may be given a smooth, flat, finish by placing them in a suitable press between metal plates heated to about 150° C. for about 3 to 10 minutes and applying a pressure of about 2000 pounds per square inch. They are cooled while still under pressure, and then removed from the press.

What I claim as new and desire to secure by Letters Patent of the United States, is:—

1. A flexible resinous insulating composition comprising a citrate of a polyhydric alcohol and an organic compound of the aromatic series, having insulating properties.

2. A flexible resinous insulating composition comprising a citrate of a polyhydric alcohol and dinitrobenzene associated therewith.

3. The process which consists in dissolving citric acid, a polyhydric alcohol and dinitrobenzene in alcohol and baking to cause chemical reaction with the formation of a flexible resinous condensation product.

4. The process which consists in dissolving citric acid, glycerin and meta-dinitrobenzene in alcohol and heating to a temperature of about 125 to 200° C. to produce a flexible, insoluble and infusible insulating material.

In witness whereof, I have hereunto set my hand this 28th day of May 1913.

EDWARD S. DAWSON, JR.

Witnesses:
BENJAMIN B. HULL,
HELEN ORFORD.